United States Patent [19]

Colombo

[11] Patent Number: 4,766,990
[45] Date of Patent: Aug. 30, 1988

[54] PEAR ORIENTING AND TRANSFER APPARATUS

[75] Inventor: John W. Colombo, Castro Valley, Calif.

[73] Assignee: Atlas Pacific Engineering Company, Pueblo, Colo.

[21] Appl. No.: 429,061

[22] Filed: Sep. 30, 1982

[51] Int. Cl.[4] .............................................. B65G 47/24
[52] U.S. Cl. .................................... 198/383; 198/394; 198/463.5; 99/549
[58] Field of Search ............... 198/382, 383, 394, 396, 198/474, 492, 480, 479, 656, 695, 415, 387, 779, 689, 463.5, 463.6, 471.1; 99/549, 550

[56] References Cited

U.S. PATENT DOCUMENTS

| | | | |
|---|---|---|---|
| 2,932,378 | 4/1960 | Smith | 198/656 |
| 2,953,236 | 9/1960 | Buchner et al. | 198/653 |
| 3,011,620 | 12/1961 | Amori | 198/387 |
| 3,101,831 | 8/1963 | Gaddini | 198/383 |
| 3,144,121 | 8/1964 | Smith | 198/491 |
| 3,252,588 | 5/1966 | Altenburger | 198/689 |
| 3,797,639 | 3/1974 | Smith | 198/394 |
| 4,487,307 | 12/1984 | Meissner et al. | 198/394 |

FOREIGN PATENT DOCUMENTS

2332608  1/1975  Fed. Rep. of Germany ...... 198/383

Primary Examiner—Joseph E. Valenza
Attorney, Agent, or Firm—Ernest M. Anderson

[57] ABSTRACT

A pear orienting and transfer apparatus for orienting pears stem-end lowermost and subsequently transferring oriented pears with the blossom-end foremost to subsequent inspection, peeling, coring and segmenting stations which includes a channel-bottom reciprocable shaker pan and lifter at each channel for feeding singulated pears one at a time down a movably inclined and intermittently gated delivery chute to a set of orienting rolls that orients each pear stem-end lowermost and places it in one of a plurality of pneumatic gripping cups carried on an indexible rotary cup drum.

16 Claims, 8 Drawing Sheets

PEAR ORIENTING AND TRANSFER APPARATUS

BACKGROUND OF THE INVENTION

Heretofore pears have been fed to pear peeling and coring machines by orientors such as are disclosed in U.S. Pat. Nos. 3,144,121 and 3,797,639 issued to Lawrence H. Smith and in co-pending application Ser. No. 398,065 on Pear Orienting Apparatus filed July 14, 1982 and assigned to the assignee of this application. The latter patent and co-pending application disclose inclined delivery chutes in which some orientation takes place by differential friction on the chute between the stem-end and bulbous portion of the pear. The disclosed prior art delivery chutes feed singulated pears to an orientation cup which the delivers them to a generally conically shaped transfer cup 204. The co-pending application Ser. No. 398,065 further discloses a reciprocable contoured channel bottom shaker pan feeding at least one lifter between it and the delivery chute that is intermittently gated and is fixed in position relative to the reciprocable shaker pan motion.

BRIEF DESCRIPTION OF THE INVENTION

This invention includes a reciprocable contoured channelbottom shaker pan feeding at least one generally vertically reciprocable lifter that arrests a following singulated pear in the shaker pan channel as it raises the preceding singulated pear upwardly from a slotted channel exit for delivery onto the movably inclined and intermittently gated delivery chute. The delivery chute drops each pear onto a set of orientating rolls rotatable in the same direction to orient each pear stem-end lowermost. The rolls then separate to drop the oriented pear into a transfer cup. The transfer cup is one of a plurality of pneumatic gripping cups carried on an indexible rotary cup drum. The transfer cup grips each oriented pear around its bulbous perimeter at a receiving station and then transfers it blossom-end foremost through one or more of subsequent inspection, peeling, coring and segmenting stations.

A principal object of the present invention is a pear orienting apparatus that provides complete pear orientation prior to delivery to a transfer cup which then moves the oriented pear blossom-end foremost through one or more of a series of manipulative stations for purposes of inspection, peeling, coring or segmenting.

Another object of the present invention is to provide an improved transfer mechanism for moving pears in sequence from one to another of several manipulative stations which grips the pear around its bulbous perimeter and also centers the pear at each station.

A further object of the invention is to provide a lifter which cooperates with a reciprocable shaker pan for singulated delivery of pears onto a movably inclined and intermittently gated delivery chute wherein a lifter and the entrance end of the movably inclined chute alternatively gate each shaker pan channel at its open discharge end.

Still another object of the invention is the orientation of pears by a set of orienting rolls that orient the pears with stem-end lowermost and then separate to drop the pear in proper orientation into a transfer cup.

Other objects and advantages of the invention will be apparent from a consideration of the following description of a preferred embodiment and of the accompanying drawings.

DESCRIPTION OF A PREFERRED EMBODIMENT

The pear orienting and transfer apparatus of this invention mounts in multiple identical lanes upon the frame 1 of a complete machine which also includes peeling, coring and other processing components that are not illustrated in the drawings for purposes of clarity. The orientor aspects of the invention comprise a reciprocable contoured channel-bottomed shaker pan indicated generally at 2. A set of lifters 3 each of which receives singulated pears in cooperation with and from the shaker pan, tumbles them onto a set of corresponding V-shaped movably inclined delivery chutes designated 186. The delivery chutes are similar to the chutes having that designation in Smith Pat. No. 3,797,639, for example, but in the present invention they are pivotable relative to the machine frame 1 and perform gating functions with respect to the shaker pan 2 that are not disclosed in the prior art structures hereinbefore mentioned. Discharge from each of the set of delivery chutes 186 is controlled by corresponding discharge stop gates indicated generally at 5.

Figures 9, 10, 11:
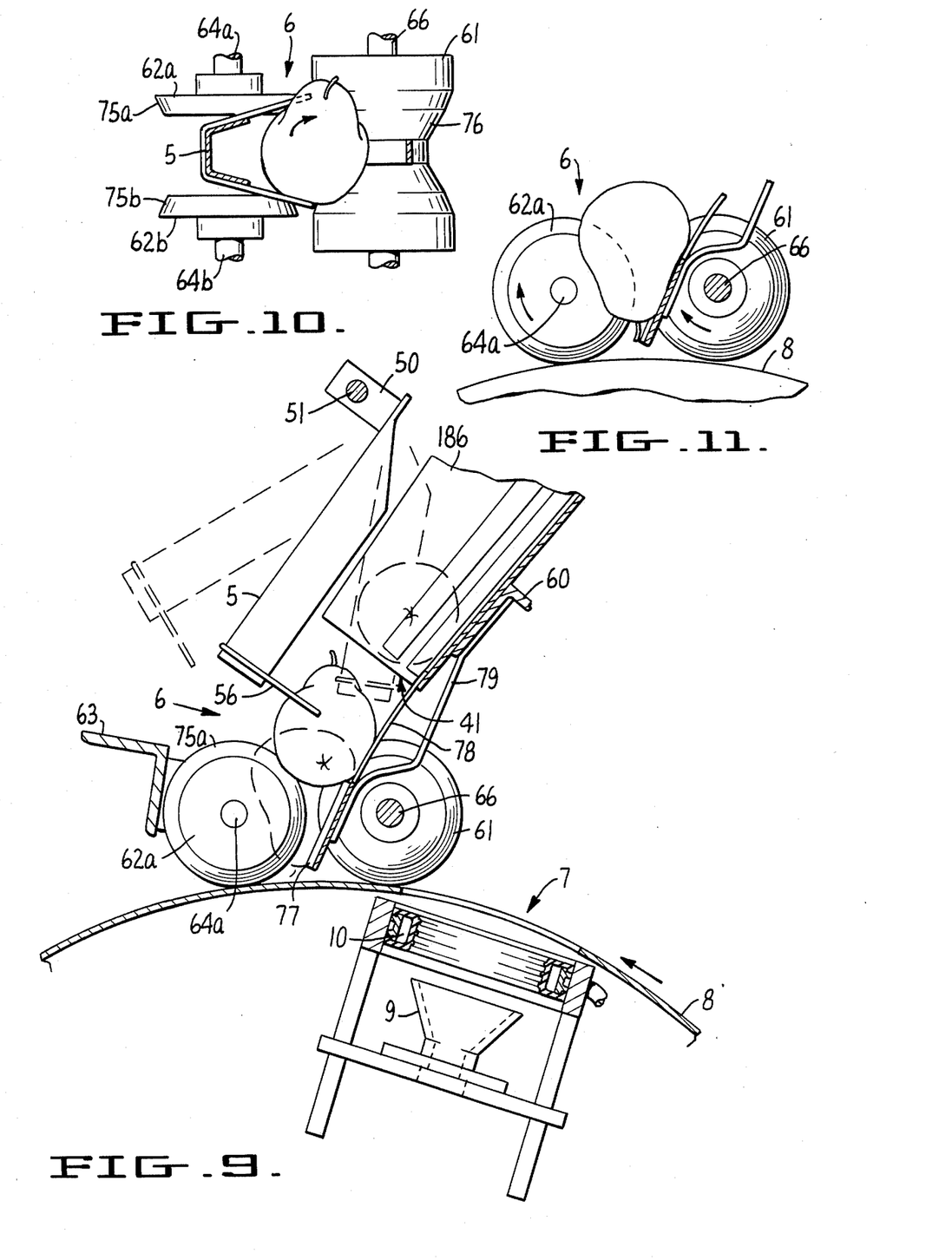
FIG. 9 is a partial side elevational view partly in section of the delivery chute, its discharge stop gate, the orienting rolls and the indexible rotary cup drum with the rolls in pearorienting position.
FIG. 10 is a top view partially in section of the orienting rolls of FIG. 9 with a pear starting to be oriented upon them.
FIG. 11 is a side elevational view partially in section of the pear after completing orientation upon the orienting rolls.
Figures 12, 13:
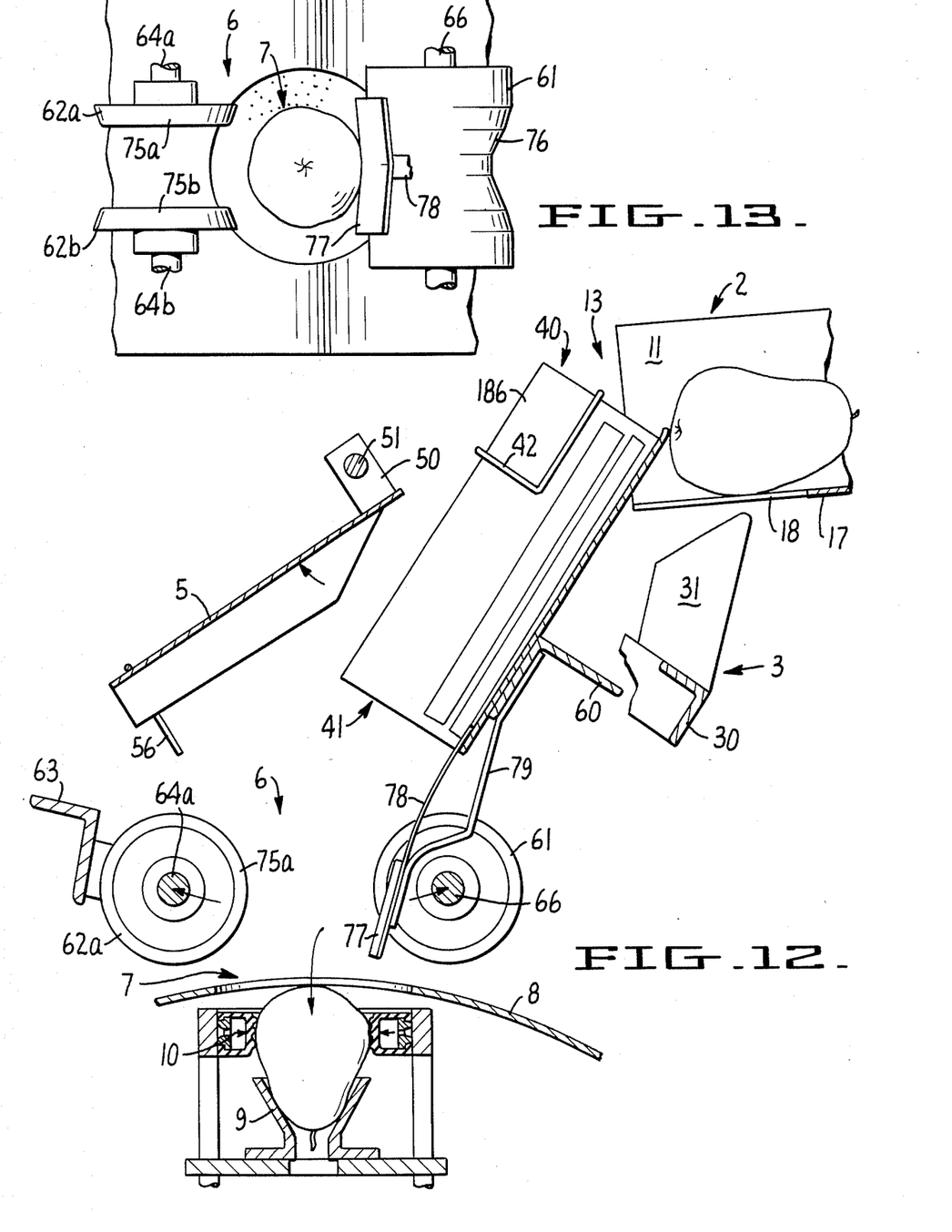
FIG. 12 is a side elevational view partly in section of the components of FIG. 3 showing the orienting rolls after separation and delivery of the oriented pear to one pneumatic gripping transfer cup on the rotary cup drum.
FIG. 13 is a top elevational view of the separated orienting rolls and pneumatic gripping cup of FIG. 12.

The delivery chutes 186 deliver parts, many of which are oriented stem-end lowermost, to sets of orienting rolls designated generally as 6. Each set of orienting rolls 6 rolls a received pear between two rolls rotating in the same direction but at different speeds to orient the stem-end lowermost in the manner described hereinafter and as is shown in FIG. 11. The set of orienting rolls 6 then separates and drops the properly oriented pear by gravity as shown in FIG. 12 into one of a plurality of transfer cups 7 carried on a rotary cup drum 8.

The rotary cup drum of the described embodiment is indexible about a horizontal axis and carries a set of transfer cups 7 on its outer periphery. These transfer cups 7 receive in a generally conically shaped cup 9 the stem-end of each oriented pear. by means of an annular pneumatically inflatable resilient ring 10 that is spaced upwardly from the apex of the conically shaped cup 9, each pear is centered and held in place in the transfer cup as the rotary cup drum 8 indexes about its horizontal axis to transfer the pears with blossom-end foremost to subsequent inspection, peeling, coring, segmenting or other manipulative stations.

Figure 1:
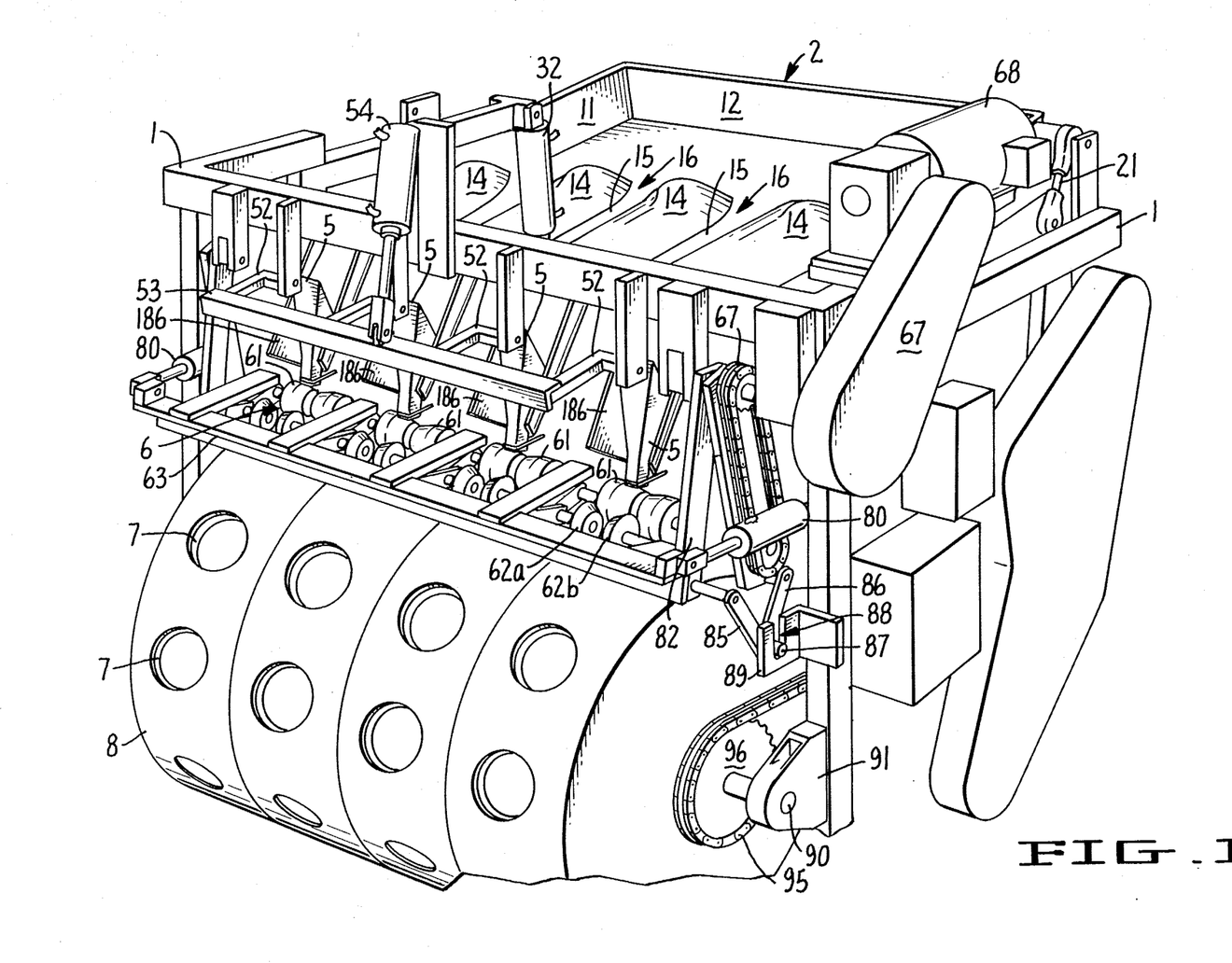
FIG. 1 is an overall perspective view of the pear orienting and transfer apparatus of this invention.

The shaker pan 2 has a pair of side walls 11, a back wall 12 and a contoured bottom as illustrated generally in FIG. 1. The bottom is flat at a fruit receiving portion along the back wall 12. Along open discharge end 13 of the shaker pan, its bottom is contoured into a series of humps 14 spaced from one another by singulation channels 15, each having a convergent entrance 16 and a straight sided exit 17 similar to the construction shown in co-pending application Ser. No. 398,065. Each singulation channel 15 feeds a separate one of lifters 3 which cooperates with a pair of exit slots 18 formed in each channel exit 17 along the open discharge end 13 of the shaker pan 2. This construction is more particularly illustrated in FIGS. 3 and 4.

The bottoms of the shaker pan channels 15 cant downwardly toward the open discharge end 13 at, for example, about 5° from the horizontal. The shaker pan mounts upon frame 1 on a pair of forward links 20 shown in FIG. 14 pivotally connected between the frame 1 and the shaker pan and a pair of rear links 21 similarly pivotally connected but adjustable in length so that the cant of the shaker pan channels 15 can be varied. Drive motor 22 through a chain drive referred to generally as 23 rotates a shaker drive shaft 24 upon which mounts a pair of eccentric shaker drive cranks 25 that pivotally connect at their other ends to the shaker pan at 26. The shaker drive cranks 25 reciprocate the shaker pan with a throw of about three-fourths of an inch at variable speeds from about 450 to 300 complete cycles per minute as shown by the directional arrows in FIG. 14.

The slightly downward reciprocatory motion of the shaker pan continuously moves pears delivered in bulk adjacent back wall 12 through the several singulation channels 15 for a multilane machine. Abutment of the bulbous perimeter of each pear with the converging entrance 16 to each channel 15 as defined by the humps 14 tends to slow travel of the bulbous portion and orient the pears stem-end forward as each pear traverses the channel 15. The channels 15 with their convergent entrances 16 also act to singulate the pears in line one-by-one for delivery through the straight sided channel exits 17 to the corresponding lifter 3, one for each machine lane.

Figures 3, 4:
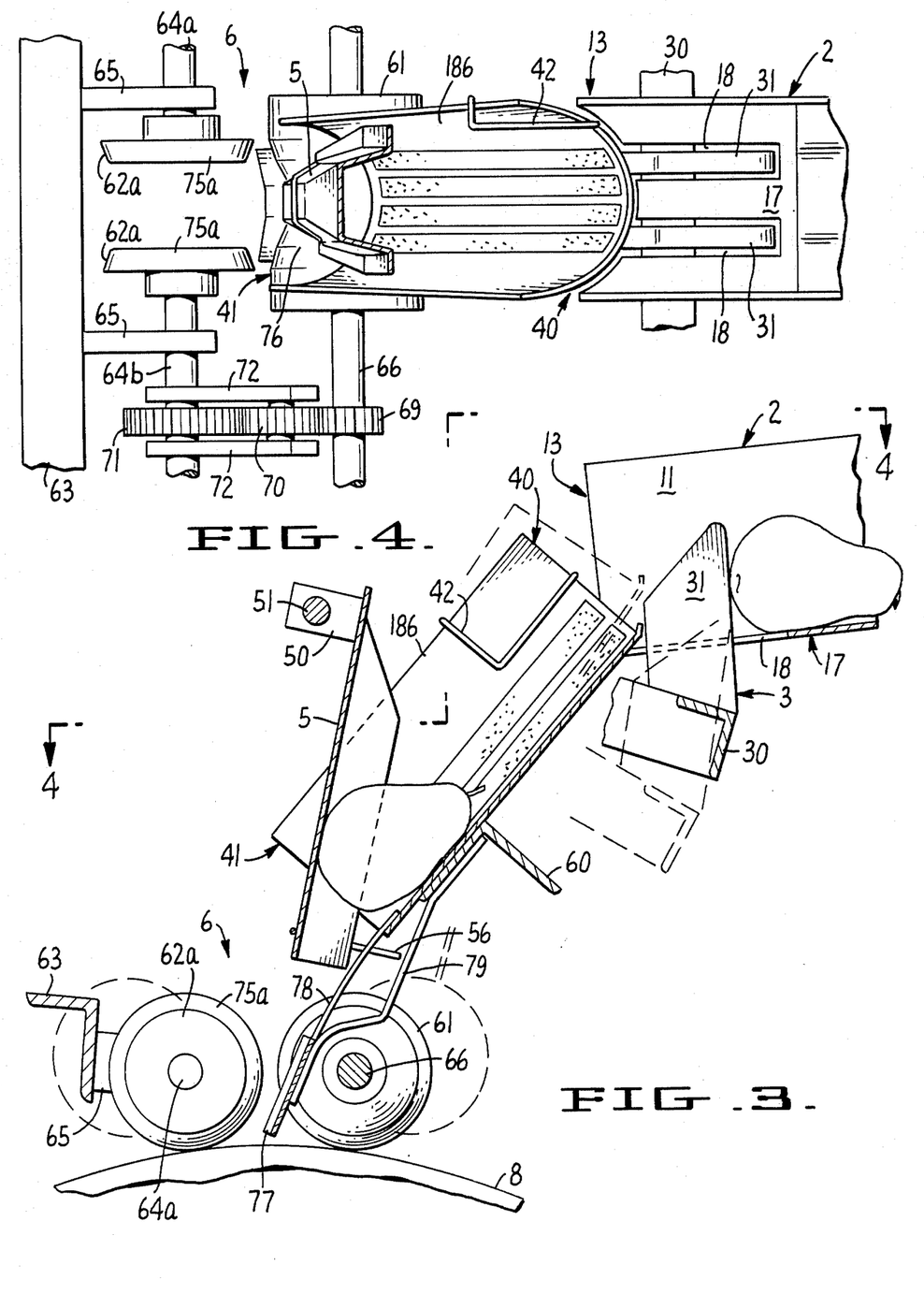
FIG. 3 is a partial side elevational view taken along line 3—3 of FIG. 2 showing the shaker pan, one delivery chute and the corresponding lifter in gated positions and the corresponding set of orienting rolls in pear-receiving position.
FIG. 4 is a top elevational view, partially in section, of those components taken along line 4—4 of FIG. 3.
Figure 6:
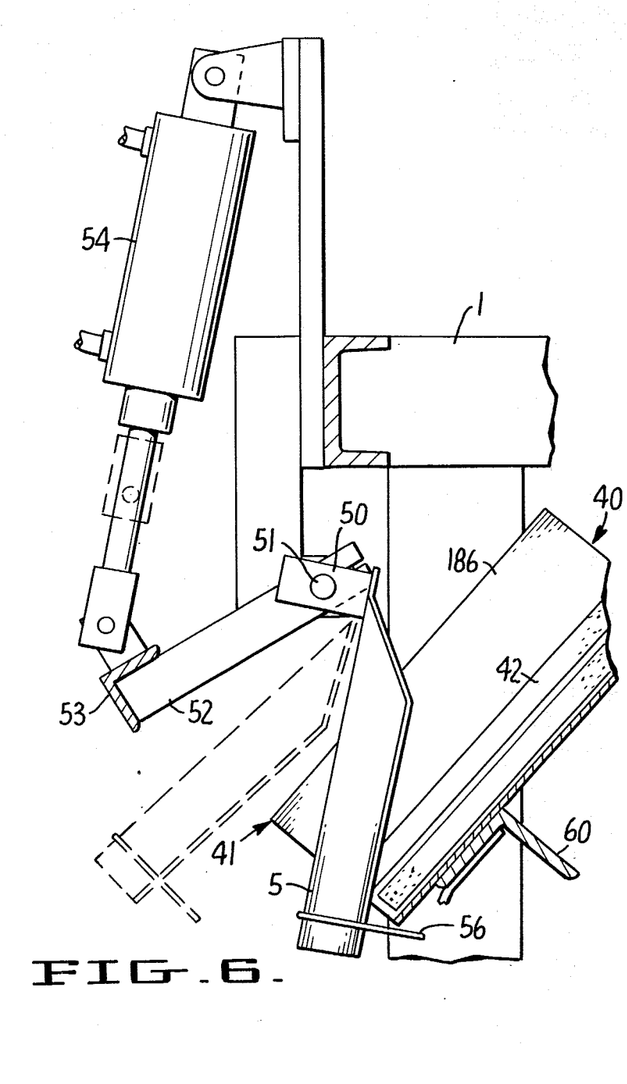
FIG. 6 is a side elevational view partly in section of the operating mechanism for the complete set of discharge stop gates for the delivery chutes.

Immediately adjacent the open discharge end 13 of the shaker pan 2 is a set of generally V-shaped delivery chutes 186, each of which is movably inclined but generally slopes downwardly from an entrance end 40 to a discharge end 41 at about 45°-60° to the horizontal as is illustrated in FIGS. 3, 6 and 12, for example. As distinguished from the prior art, the chutes 186 are not rigidly, but are pivotably mounted on the machine frame 1, as will hereinafter be explained, each in line with one of the singulation channels 15 formed in the shaker pan bottom. The delivery chutes are fabricated from stainless steel.

At the top of each delivery chute a wire 42 provides a protrusion within the chute on one side only. A pear dropping into the chute with its major axis crosswise of the chute strikes the protrusion and generally truns so that the pear major axis aligns in parallelism with the length of the chute as the pear slides down the chute into abutment with stop gate 5 with stem-end first. Thus, pears usually do not stop crosswise against the stop gates and need not turn when the gate opens to orient properly.

Figure 5:
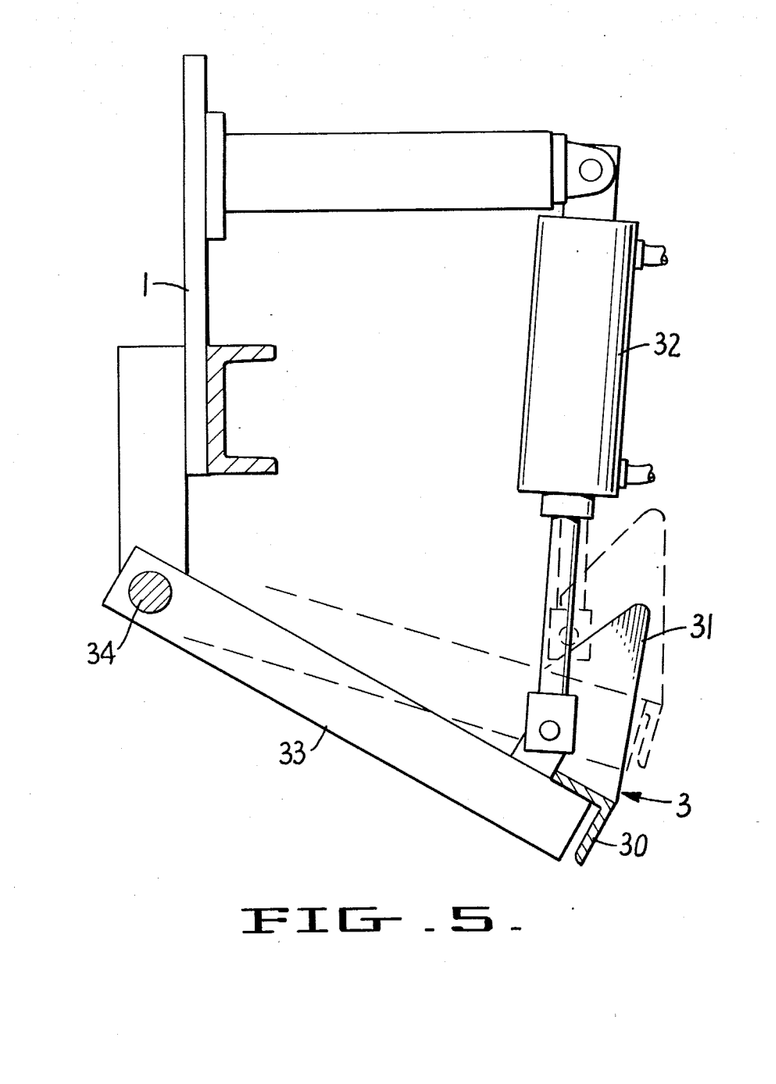
FIG. 5 is a side elevational view partly in section of the operating mechanism for the complete set of lifters.

Entrance into each chute 186 is controlled by the corresponding lifter 3 and the entrance end 40 of the movable delivery chute 186. As shown more particularly in FIGS. 3, 4, 5 and 12, each lifter 3 mounts upon a common lifter bar 30 and has a pair of vertically extending ears 31 that move up and down within the slots 18 formed at the exit 17 of each channel 15. As shown in FIG. 5 pneumatic lifter cylinder 32 pivots the common lifter bar 30 by means of a pair of levers 33 journaled on pivots 34 mounted on the machine frame 1.

In the lowermost position of each lifter 3, as shown in FIG. 12, the shaker pan 2 moves singulated pears, such as the one there illustrated, over the slots 18 formed in the exit 17 of each singulation channel 15. The ears 31 of each lifter 3 in this position retract from the slots 18 and lie below them as is illustrated in FIG. 12. In this position, the several delivery chutes 186 move upwardly when the orienting rolls separate, as will be hereinafter described, so that their entrance ends 40 gate the channel exits 17 and singulated pears are held within the channel exit 17.

Then as the lifters 3 move upwardly to the uppermost position, shown in FIG. 3, the ears 31 lift the singulated pear that overlies slots 18, such as the one shown in FIG. 12, onto the delivery chute 186 as it is moved downwardly to the position shown in FIG. 3 when the orienting rolls close. The pear slides down the chute to its gated discharge end 41 where the pear is arrested as is the one on the chute in FIG. 3 by stop gate 5. In the uppermost position, the ears 31 of lifter 3 gate the following pear and hold it in the channel exit 17 as is also shown in FIG. 3. When the ears 31 retract downwardly again to the position shown in FIG. 12, the gated pear in the channel exit 17 then can be shaken into the position overlying the slots 18 as in FIG. 12 for subsequent delivery by the lifters to the delivery chutes as hereinbefore described.

Exit of pears from the delivery chutes 186 is controlled by intermittently pivoted discharge stop gates 5. Each as illustrated in FIG. 1 is a downwardly tapered channel carried on the end of a crank 50 shown most clearly in FIGS. 3, 6, 9 and 12. The several stop gate cranks 50 are pivoted on axle 51 by means of levers 52 joined by angular gate bar 53, shown in FIGS. 1 and 6, that pivots all of them by means of a manipulative pneumatic gate cylinder 54 pivotally interconnecting the gate bar 53 and the machine frame 1. In timed synchronization with the lifter motion developed by pneumatic lifter cylinder 32, the gate cylinder 54 pivots the chute discharge stop gates 5 from the closed position shown in FIG. 3, which holds pears in the chute 186, to the open position shown in FIG. 12 and in phantom lines in FIGS. 6 and 9, that permits any pear on the chute 186 to proceed downwardly onto the corresponding set of orienting rolls 6. A spring wire 56 on the end of each chute stop gate 5 lightly cradles the pear as it leaves the chute also to prevent the pear from dropping crosswise on the set of orienting rolls. Crosswise pears on the rolls will merely roll and not orient.

The several delivery chutes 186 mounted on the common chute bar 60, shown in each of FIGS. 3, 6, 7, 9 and 12, move from one extreme position with the entrance end 40 in the pear receiving position of FIG. 3 and with stop gate 5 closed to another extreme position with stop gate 5 open, orienting rolls 6 separated and the chute 186 in a gating position as shown in FIG. 12. Each singulated pear lifted by lifter 31 onto the delivery chute 186 slides down the chute as in FIG. 3 to a position adjacent the stop gate 5 which slowly opens to drop the arrested pear, as in FIG. 3, onto the orienting rolls 6, as in FIG. 9. The slow opening of the stop gates 5 allows a pear with stem-end trailing to turn over until it drops on the rolls stem-end first. A pear with the stem-end leading simply slides out of the chute without turning.

The wire 42 on the top of each delivery chute 186, wires 56 on the stop gate, the trough-like shape of the chute and the shape and speed of opening of stop gate 5, all play a part in pre-orienting the pear for final orientation on the orienting rolls 6.

The orienting rolls 6 comprise, in general, a pair of rolls driven in the same direction at different speeds on horizontal spaced axes to receive singulated pears from a delivery means, such as gated delivery chute 186. The rolls orient each received pear stem-end lowermost and then separate to drop the pear by gravity into transfer cup 7. One of the pair of rolls is a centrally grooved single back roll 61 rotatable at a first speed about a first horizontal axis as shown in FIG. 13. It may have a narrow chamfered groove centering upon the corresponding delivery chute 186 and the aligned transfer cup 7 or it may be two closely spaced separate rolls that taper to the center to provide a directional chamfered groove between them. The set of orienting rolls also includes spaced forward rolls 62a, 62b shown in FIGS. 1, 4, 10 and 13, for example, that rotate at a second slower speed about the second horizontal axis. Forward rolls 62a, 62b also have faces chamfered toward the center of the chute and transfer cup and are spaced apart somewhat more than the width of the neck of a pair so as to hold the pears in position overlying the cup and to permit the pear neck to drop between them as the pear turns upon the rolls 61, 62a and 62b.

The set of orienting rolls 6 is in the pear receiving position in FIGS. 3 and 9 at the time there is a pear at the end of the delivery chute 186 as shown in FIG. 3 and as the chute stop gates 5 open as shown in FIGS. 9 and 10 to drop the pear onto the spaced rotating rolls. The rolls through drive mechanisms, one of which is shown in elevation in FIG. 8, rotate in the same direction as shown by the directional arrows. In this pear receiving position they orient each pear stem-end lowermost in about a 3 second cycle.

The set of orienting rolls 6 then separates as shown in FIG. 12 just long enough to drop the oriented pear stem-end lowermost into the conically shaped cup 8 of the transfer cup 7 that is indexed by rotary cup drum 8 underneath and directly between the separated rolls. When the rolls 6 separate the delivery chutes 186 move upwardly as shown in FIG. 12, the stop gates 5 close and the lifters 3 rise through the shaker pan slots 18 to lift a pear to the entrance end 40 of the chute. As the rolls then close the chute moves down to accept the pear delivered by the lifter 31 to its entrance end 40.

Figure 2:
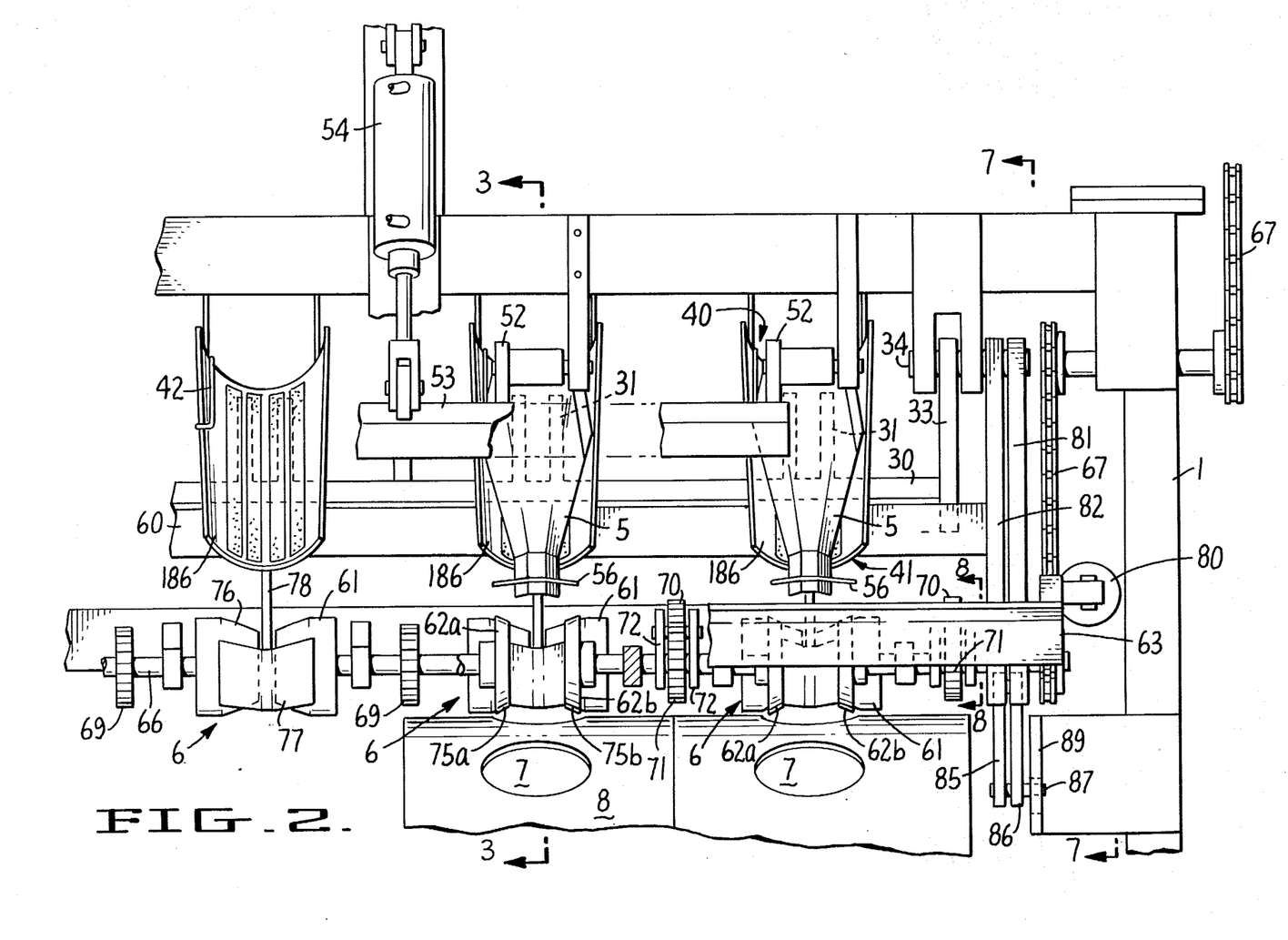
FIG. 2 is a partial front elevational view of the apparatus shown in FIG. 1.
Figure 7:
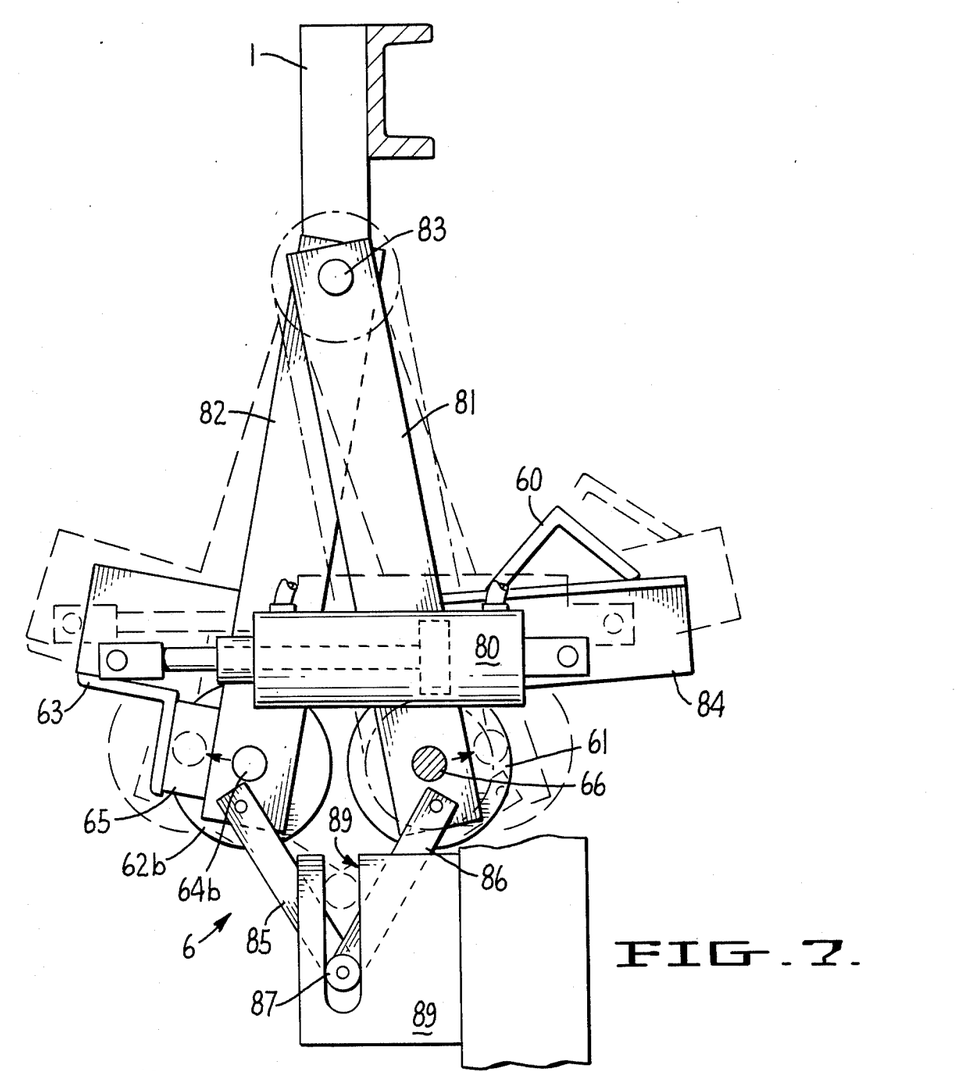
FIG. 7 is an elevational view partly in section of the delivery chute pivot mechanism and the separation mechanism for the orienting rolls taken along line 7—7 of FIG. 2.

As illustrated more clearly in FIGS. 2 and 4, the spaced forward rolls 62a, 62b are carried on a common forward roll bar 63 which by means of the mechanism shown in FIG. 7 moves the forward rolls alternately from their pear receiving position of FIGS. 3 and 9 to the pear delivery position of FIG. 12. These front rolls 62a, 62b rotate upon stub axles 64a, 64b journaled in brackets 65 carried by the forward roll bar 63. The back roll 61, or rolls, are carried by and driven upon drive shaft 66 connected through chain drive 67 to variable speed motor 68. When in the pear receiving position of FIGS. 3 and 9, the pinion gears 69 shown in FIG. 8 on the drive shaft 66 through idler gears 70 and drive gears 71 on each stub shaft 64a, 64b drive the front rolls 62a, 62b. As shown in FIG. 2 there are a plurality of pinion gears 69 spaced along the drive shaft 66 to drive through corresponding idler gears 70 and front roll drive gears 71 the sets of front rolls 62a, 62b. In order to facilitate orienting roll separation, idler gears 70 are journaled upon brackets 72 carried also from the forward roll bar 63 as is illustrated in FIG. 8.

The particular orienting rolls illustrated have peripheral surfaces which cant toward the center of each machine lane defined by the center of the singulation channel 15, delivery chute 186 and transfer cups 7 for each lane. The surfaces 75a, 75b of the separated forward rolls are chamfered inwardly toward that center at about 20 degrees. The peripheral faces 75a, 75b are about $\frac{1}{2}$ inch in width along the second horizontal axis and the spacing between the centermost edges of the forward rolls is about 1$\frac{1}{2}$ to 2$\frac{1}{4}$ inches. The back roll peripheral face 76 is chamfered toward the same lane center with about 1$\frac{1}{2}$ inches of surface to each side of the center at about 20 degrees chamfer angle with respect to the first horizontal rotational axis. The angularity of these rotating surfaces may be varied. Angles of 15 degrees to 30 degrees have been found to be useful.

The mechanism of FIG. 7 mounted from the frame 1 at each end of the machine separates the orienting rolls in synchronism with the other machine motions to the position shown in FIGS. 12-13 for delivery of oriented pears, such as that shown in FIG. 11, into the transfer cup 7. The separation motion is accomplished by pneumatic orienting roll cylinders 80 which pivotally interconnect the forward roll bar 63 and the lower ends of depending links 81 upon which the back roll drive shaft 66 is journaled. The forward roll bar 63 depends on links 82 at each end of the machine pivoted on axles 83 journaled on frame 1 from which links 81 also pivot in scissors-like fashion. Support members 84 interconnect links 81 and also carry the delivery chute bar 60 to pivot the delivery chutes 186 simultaneously with orienting roll separation. As cylinders 80 move the lower ends of the depending links 81, 82, they are guided by control bars 85, 86 pivoted to the lower extremity of each, respectively, and joined at their ends to a common follower 87 which travels in the vertical slot 88 of a guide plate 89 also mounted upon the machine frame 1.

Figure 8:
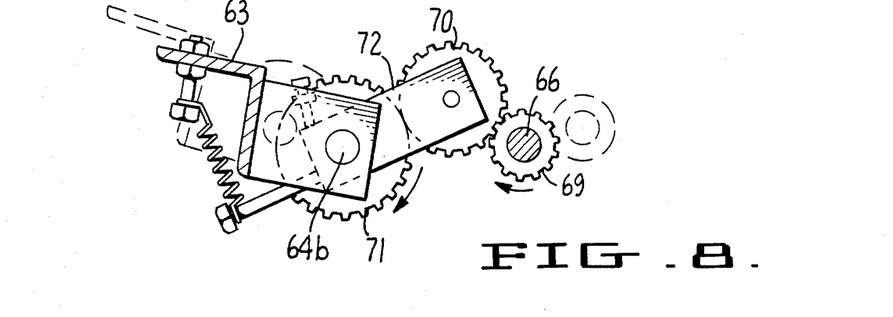
FIG. 8 is a side elevational view of the orienting roll drive for one set of rolls taken along line 8—8 of FIG. 2.

Thus it is apparent from FIGS. 2, 7 and 8 that as the orienting roll cylinders 80 expand, the back and forward rolls of each set of orienting rolls separate to permit a pear to drop from them into transfer cup 7. Simultaneously, the delivery chute bar 60 pivots the delivery chutes from their lower position of FIGS. 3 and 9 to their upper shaker pan gating position shown in FIG. 3. During this separation motion the forward roll bar 63 carries forward roll drive gear 71 and idler 70 forwardly with it, whereas the back roll drive shaft 66 and its pinion gears 69 are carried by link 81 backwardly into the hidden position illustrated by broken lines in FIG. 8. The segmented chain drive 67 shown in FIG. 14 continuously rotates drive shaft 66 from gear-head orienting roll drive motor 68. The forward rolls 62a, 62b, on the other hand, are intermittently driven only in the pear-receiving position when the idler 70 engages the corresponding pinion gear 69 on the back roll drive shaft 66. When separated, forward rolls 62a, 62b stop rotating so they do not turn the oriented pear out of position as it drops past them into the transfer cup 7.

Rotation of the pears is stopped by a pear guide plate 77 after the pear orients stem-end lowermost. The plate falls over the central groove of the back roll 61 and overlies at least the lower portion of its chamfered periphery 76 as shown in FIG. 2. The guide plate 77 depends from the corresponding delivery chute 186 upon a resilient leaf spring 78 and is supported by a backup bracket 79. This structure is most clearly illustrated in FIGS. 2, 3 and 9. When the pear is oriented stem-end lowermost, the neck of the pear contacts guide plate 77 which prevents the roll 61 from rotating the pear further. The guide plates 77 also form a continuation of the delivery chutes 186 to guide the pears into transfer cups 7 when the orienting rolls 6 separate.

The orienting rolls in the described embodiment have a 2 to 1 speed ratio, that is, rolls 62a and 62b are driven at half the speed of roll 61. Back roll 61 is the primary driver for the pear, the two forward rolls slightly assist in turning it. Once the pear is oriented forward rolls 62a and 62b just slide on the skin of the pear at half the speed of back roll 61 and guide plate 77 prevents the back roll 61 from continuing to rotate the pear. This combination of guide plate 77 and the half speed of forward rolls 62a and 62b as compared to back roll 61 make this system work successfully.

Figure 14:
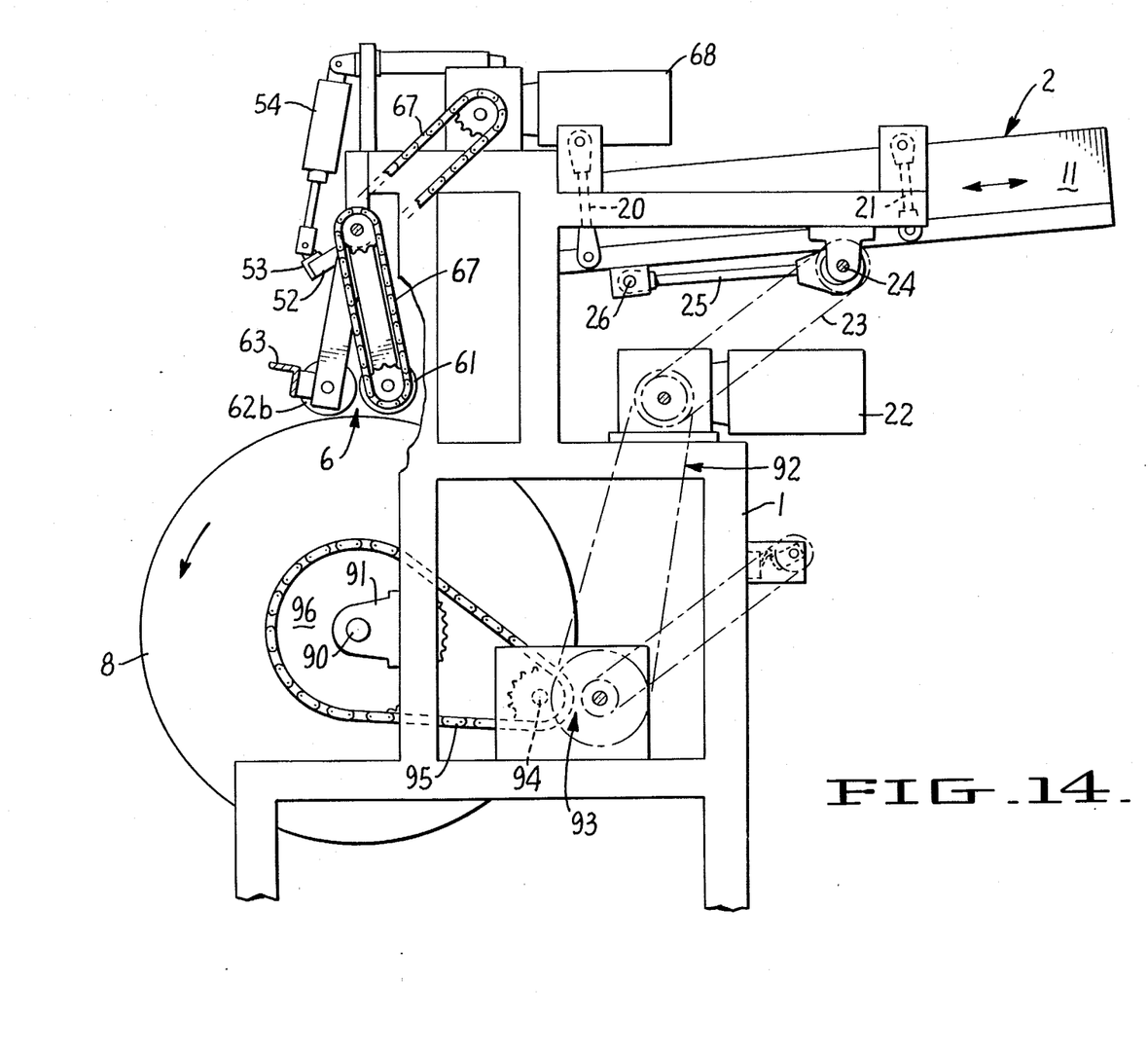
FIG. 14 is a side elevational view of the apparatus showing the drive mechanisms for the several machine components.

FIG. 14 also illustrates the rotary cup drum drive. The drum 8 rotates upon an axle 90 journaled in pillow-block bearings 91 mounted on the machine frame 1. Motor 22 through chain 92 drives a Geneva wheel index mechanism 93 that intermittently drives sprocket 94 which by chain 95 drives drum sprocket 96 to index the drum through its several manipulative stations. As shown, the pear-receiving station is at top of the drum for gravity feed or oriented pears into the transfer cups 7 at that station.

Various modifications of the described components may become apparent to those familiar with the art and within the scope of the inventions defined in the following claims.

I claim:

1. A pear orienting apparatus comprising:
    (a) a frame;
    (b) a shaker pan reciprocably mounted on the frame and having at least one singulation channel for supporting and conveying pears and having a slotted exit over which pears pass toward an open discharge end of the pan;
    (c) an inclined delivery chute pivotally mounted adjacent to the slotted exit of each channel of the shaker pan and having an entrance end and a discharge end;
    (d) a separate lifter reciprocable in the slotted exit of each channel of the shaker pan for gating a following pear in said channel while simultaneously lifting onto the corresponding delivery chute each pear that overlies the slotted exit of said channel, and
    (e) means for pivoting the entrance end of the delivery chute upwardly into a gating position with respect to the corresponding shaker pan channel as the lifter moves downward to permit the following pear to move into position overlying the slotted channel exit, said delivery chute remaining in a gating position until the lifter begins to rise.

2. The pear orienting apparatus of claim 1 further having means for gating each delivery chute at its discharge end including a pivotable chute stop gate and means for intermittently opening the chute stop gate during upward motion of the corresponding delivery chute.

3. The pear orienting apparatus of claim 1 further comprising a set of orienting rolls adjacent the discharge end of each delivery chute; drive means for rotating the set of orienting rolls in the same direction; a transfer cup; and means for intermittently separating the orienting rolls to drop an oriented pear with stem-end lowermost into the transfer cup.

4. The pear orienting apparatus of claim 3 wherein said transfer cup comprises one of a plurality of pneumatic gripping cups carried on an indexible rotary cup drum, said drum being rotatable upon a horizontal axis disposed beneath each set of orienting rolls.

5. Pear orienting and transfer apparatus comprising
    (a) a set of orienting rolls including at least a pair of rolls mounted for rotation upon spaced horizontal axes;
    (b) drive means for rotating the pair of rolls in the same angular direction;
    (c) means feeding singulated pears to the top of the rolls intermediate said spaced axes;
    (d) a transfer cup;
    (e) means for intermittently moving said transfer cup in a cyclical path from a position beneath said rolls for receiving a pear to positions for treating the pear; and
    (f) means for intermittently separating the orienting rolls to drop an oriented pear with stem-end lowermost into the transfer cup.

6. The pear orienting and transfer apparatus of claim 5 wherein the speed of one of the pair of rolls is half the speed of the other of the pair.

7. The pear orienting and transfer apparatus of claim 5 further comprising an indexible rotary cup drum carrying a plurality of transfer cups angularly spaced equal angular distances, said drum being rotatable upon a horizontal axis disposed beneath each set of orienting rolls.

8. The pear orienting and transfer apparatus of claim 5 wherein the transfer cup includes a generally conically shaped cup having its apex lowermost for receiving the pear stem-end lowermost and an annular pneumatically inflatable resilient ring spaced upwardly from the apex of and being coaxial with said conically shaped cup for gripping the bulbous perimeter of a pear.

9. The pear orienting and transfer apparatus of claim 5 and means for laterally moving both of said orienting rolls away from the other.

10. The pear orienting and transfer apparatus of claim 9, said orienting rolls being rotatably mounted upon a pair of pivoted links, pivotal movement of said links causing said rolls to separate above a transfer cup.

11. Pear orienting apparatus comprising
   (a) a set of orienting rolls including at least a pair of rolls rotating about spaced horizontal axes;
   (b) drive means for rotating the pair of rolls in the same angular direction;
   (c) delivery means feeding singulated pears to the top of the rolls intermediate said spaced axes;
   (d) means for intermittently separating the orienting rolls to drop an oriented pear with its stem-end lowermost; and
   (e) means for interrupting the rotation of rolls mounted upon one horizontal axis when the pair of rolls separate.

12. The pear orienting apparatus of claim 11 wherein the speed of one of the pair of rotating rolls is half the speed of the other of the pair.

13. The pear orienting apparatus of claim 11 and means for laterally moving both of said orienting rolls away from the other.

14. The pear orienting apparatus of claim 13, said orienting rolls being rotatably mounted upon a pair of pivoted links, pivotal movement of said links causing said rolls to separate above a transfer cup.

15. The pear orienting apparatus of claim 12 wherein the rotation of the one of the pair of rolls that rotates at half speed is interrupted upon separation of the orienting rolls.

16. The pear orienting apparatus of claim 15 wherein the other roll is continuously driven and further comprised a guide plate depending below the axis of the roll over the chamfered face to prevent rotation of the stem-end of an oriented pear.

* * * * *